(12) United States Patent
Das et al.

(10) Patent No.: US 9,277,521 B2
(45) Date of Patent: Mar. 1, 2016

(54) SYNCHRONIZATION OF A RADIO DEVICE

(71) Applicant: Telefonaktiebolaget L M Ericsson (publ), Stockholm (SE)

(72) Inventors: Sajal Kumar Das, Bangalore (IN); Pankaj Jaiswal, Bangalore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 130 days.

(21) Appl. No.: 14/098,588

(22) Filed: Dec. 6, 2013

(65) Prior Publication Data

US 2014/0161116 A1    Jun. 12, 2014

Related U.S. Application Data

(60) Provisional application No. 61/759,518, filed on Feb. 1, 2013.

(30) Foreign Application Priority Data

Dec. 11, 2012  (IN) ............................ 3811/DEL/2012
Jan. 25, 2013  (EP) ..................................... 13152710

(51) Int. Cl.
*H04J 3/06* (2006.01)
*H04W 56/00* (2009.01)

(52) U.S. Cl.
CPC ...... *H04W 56/0085* (2013.01); *H04W 56/0035* (2013.01); *H04W 56/0015* (2013.01)

(58) Field of Classification Search
None
See application file for complete search history.

(56) References Cited

U.S. PATENT DOCUMENTS

| | | | | |
|---|---|---|---|---|
| 6,310,896 B1* | 10/2001 | Langberg et al. | ............. | 370/503 |
| 6,347,234 B1* | 2/2002 | Scherzer | ................... | 455/562.1 |
| 6,584,164 B1* | 6/2003 | Tuukkanen | ................... | 375/365 |
| 6,674,817 B1* | 1/2004 | Dolle et al. | ................... | 375/342 |
| 2003/0236108 A1* | 12/2003 | Li et al. | ...................... | 455/562.1 |
| 2013/0070828 A1* | 3/2013 | Das et al. | ..................... | 375/226 |

OTHER PUBLICATIONS

Third Generation Partnership Project, "3GPP TS 45.008 V7.2.0 (Jan. 2006)," 3rd Generation Partnership Project; Technical Specification Group GSM/Edge Radio Access Network; Radio subsystem link control (Release 7). Jan. 2006. pp. 1-111.

(Continued)

*Primary Examiner* — Michael J Moore, Jr.
(74) *Attorney, Agent, or Firm* — Murphy, Bilak & Homiller, PLLC

(57) ABSTRACT

The present disclosure relates to a method for synchronizing a radio device with a network node of a Global System for Mobile Communications, GSM, radio communication system. The method comprises obtaining a reference array based on a known training sequence, TSC, of a synchronization burst, SB, of a synchronization channel, SCH, of the network node. The method also comprises receiving an SB including the TSC from the network node and forming a received array. The method also comprises comparing the reference array to the received array for finding a sequence of the received array which has identity with the reference array, and thereby finding the position of the TSC in the received SB. The method also comprises determining whether the identity of the found sequence with the reference array is above a predefined threshold, in which case the radio device can be time synchronized based on the found TSC.

17 Claims, 10 Drawing Sheets

(56) References Cited

OTHER PUBLICATIONS

Third Generation Partnership Project, "3GPP TS 45.002 V11.0.0 (Aug. 2012),"3rd Generation Partnership Project; Technical Specification Group GSM/Edge Radio Access Network; Multiplexing and multiple access on the radio path (Release 11). Aug. 2012. pp. 1-112.

Third Generation Partnership Project, "3GPP TS 45.008 V11.0.0 (Mar. 2012)," 3rd Generation Partnership Project; Technical Specification Group GSM/Edge Radio Access Network; Radio subsystem link control (Release 11). Mar. 2012. pp. 1-148.

Third Generation Partnership Project, "3GPP TS 45.010 V11.0.0 (Aug. 2012)," 3rd Generation Partnership Project; Technical Specification Group GSM/Edge Radio Access Network; Radio subsystem synchronization (Release 11). Aug. 2012. pp. 1-32.

* cited by examiner

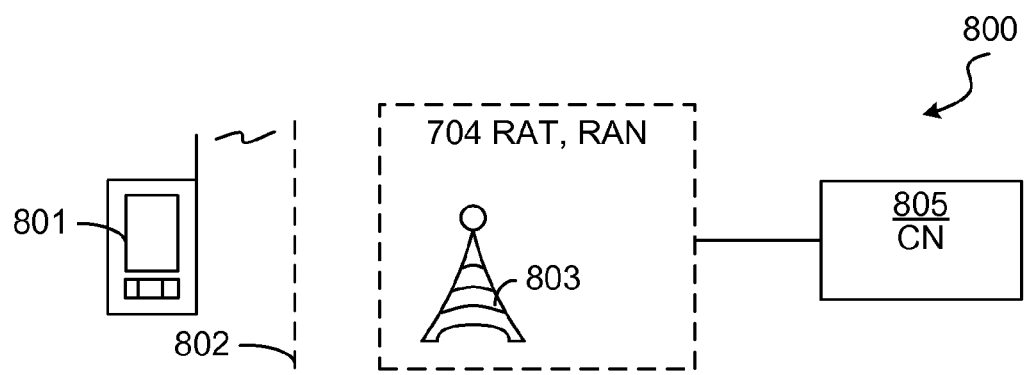
Fig. 8
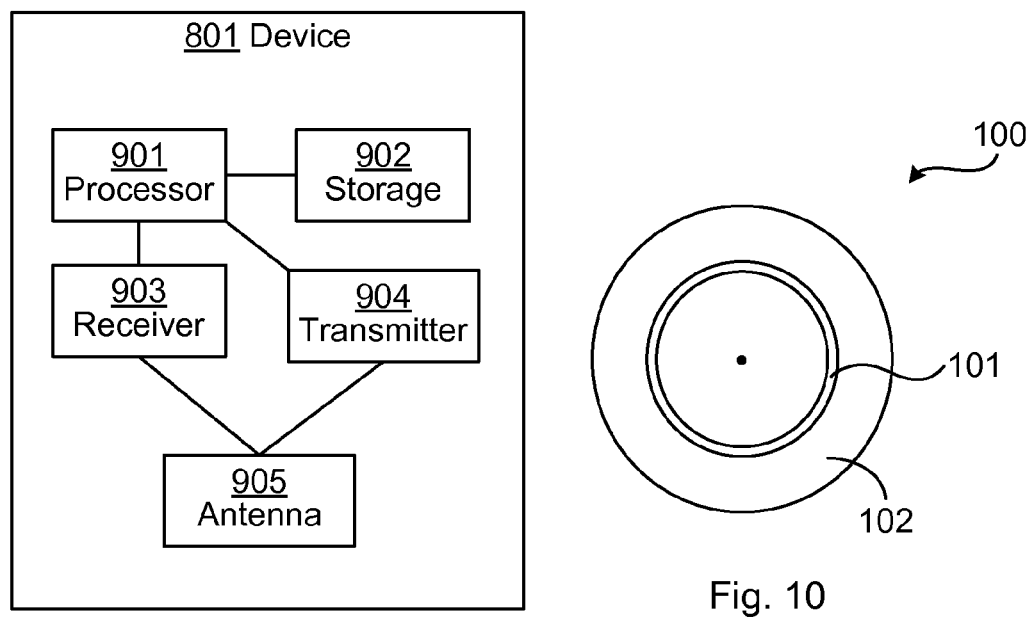
Fig. 9
Fig. 10

SYNCHRONIZATION OF A RADIO DEVICE

RELATED APPLICATIONS

This application claims priority under 35 U.S.C. §119 from the U.S. provisional patent application filed on 2013 Feb. 1 and identified by App. No. 61/759,518, and from the European patent application filed on 2013 Jan. 25 and identified by App. No. 13152710.3, and from the Indian patent application filed on 2012 Dec. 11 and identified by 3811/DEL/2012.

TECHNICAL FIELD

Generally, the present disclosure relates to communication receiving systems and, more particularly, to Global System for Mobile Communications (GSM) receiver system, which uses cell selection, synchronization and cell re-confirmation mechanisms. In particular, the present disclosure relates to a method for synchronizing a radio device with a network node of a GSM radio communication system. The disclosure also relates to such a radio device.

BACKGROUND

According to the existing communication standards, when a GSM supported mobile is switched ON, it measures the Received Signal Strength Indication (RSSI) of different frequencies in the supported frequency bands and create an ordered list of frequencies from highest RSSI to lowest RSSI and pass it on to a higher layer. Next, the higher layer instructs Layer 1 (L1) to program the radio frequency (RF) module to continuously receive the amplitude/phase (I, Q) sample data and search for the Frequency Correction Channel (FCCH) burst data using an FCCH detector algorithm in the base-band. This is shown in FIG. 1 which is a GSM initial cell selection flow diagram; where FB is the frequency burst of the FCCH, SB is the synchronization burst of the Synchronization Channel (SCH), and BCCH is the Broadcast Control Channel.

Since FCCH burst information carries all zero sequences (e.g. a total of 142+3+3=148 number of zeros), after the Gaussian Minimum Shift Keying (GMSK) modulation at the Base Transceiver Station (BTS), it becomes a pure sine wave tone of frequency Rubidium (Rb)/4=67.77 KHz. The FCCH detector algorithm detects the presence of FCCH information in the received I, Q samples and, if detected, then it provides the frequency error estimated and also the bursts boundaries in time. Knowing these output parameters help to first correct the mobile station (MS) frequency offset. And then, as the burst boundaries are known (burst start position known), so the RF module is programmed for SCH burst reception in the next Time Division Multiple Access (TDMA) frame (since the SCH appears one frame after the FCCH frame in the 51 multi-frame structure as shown in FIG. 2; where F indicates an FCCH frame, S indicates an SCH frame, B indicates a BCCH frame, P indicates a Paging Control Channel (PCCH) frame or a Common Control Channel (CCCH), and I indicates an idle frame. The channels shown in FIG. 2 appear in a time-multiplexed manner in the same frequency and time slot (0) one after the other as shown in FIG. 2.

The SCH contains the Synchronization Burst (SB). The content of the SB structure e.g. data content is shown in FIG. 3. The SB contains, in sequence: 3 tail bits, 39 encoded information bits, 64 Training Sequence (TSC) bits, 39 encoded information bits, 3 tail bits, and 8.25 guard bits. The 64 bits TSC is the same for the whole GSM system and is known to the mobile station (MS) (see the Third Generation Partnership Project (3GPP) Technical Specification (TS) 45.002, section 5.2.5).

The training sequence used by a BTS for the SB burst transmission is (where b indicates the bit number of the SB): b42,b43,b44, . . . , b105=(1,0,1,1,1,0,0,1,0,1,1,0,0,0,1,0,0,0, 0,0,0,1,0,0,0,0,0,0,1,1,1,1,0,0,1,0,1,1,0,1,0,1,0,0,0,1,0,1,0,1, 1, 1,0,1,1,0,0,0,0,1,1,0,1,1)

The SB burst is always GMSK modulated and sent without any interleaving. That means one burst is enough for decoding. Since the FCCH helps to some extent with obtaining the burst boundary and according to that, the RF window opening time is adjusted to receive the SB burst in the next TDMA frame. Also, coarse frequency error is corrected after the FCCH detection. Once the I,Q samples for the SCH burst are received according to the adjusted RF window, then the I,Q pairs are passed to the base-band for channel estimation, demodulation and decoding of SCH data. The channel estimation process of the SCH is complex since it contains 64 TSC bits. Generally, +−8 bits on both the side of the TSC are allowed to shift and the channel estimation is searched from +−8 bits on both the side of the expected position of the TSC. If the time offset is more than 8 bits, then the channel estimation will fail.

Once the SCH is decoded, it provides 25 information bits. The data includes the Base Station Identity Code (BSIC) and the frame number of the current frame within the hyper frame (19 bit Reduced Frame Number). The BSIC consists of three-bit Network Color Code (NCC) and three bit Base station (BS) color code. This is then used for time synchronization.

The receiver blocks for the FCCH and SCH reception, for FCCH and SCH reception in standard scenarios of MS cell selection, reselection and handover procedures, are shown in the FIG. 4, with FCCH detection block and one SCH detection and decoding block; where RFN indicates Reduced Frame Number.

The above discussed procedure of first receiving FCCH and then SCH in next TDMA frame e.g. after 4.615 ms, is used in many cases, like (a) During the cell selection and re-selection time: MS detects FCCH and then this is followed by SCH decoding for frequency and time synchronization to the new cell.

(b) During the blind Handover time: MS detects the FCCH and then this is followed by SCH channel decoding for the new handover cell for synchronization.

(c) During neighbor cell monitoring: During the GSM neighbor cell measurement, the MS needs to search the FCCH (which appears in time multiplexed manner in the cell broadcast channel e.g. broadcast frequency and time slot number 0) for all the detected strongest cell frequencies (based on the measured RSSI) in the monitored cell list.

(d) During the periodic cell reconfirmation (BSIC reconfirmation): MS receives and decodes the SCH channel's data for BSIC re-confirmation purpose (see 3GPP TS 45.008).

For the processes of (a) and (b), the MS has to first detect the FCCH and then program the RF module for SCH reception in the next TDMA frame, that means after 8 time slots. This has several potential drawbacks, like:

(1) In I-RAT (Inter Radio Access Technology—when the MS supports many Radio Access Technologies (RATs)) scenario, where the measurement gap time is too short, whereby performing the FCCH and SCH reception in a single time gap (which is provided by the other, active, RAT to the GSM RAT) is difficult, and also aligning the FCCH and SCH frames with the gap is a problem. As shown in the below FIG. 5, FCCH detection is attempted in many gaps and finally succeeded in the Gap#N. SCH decoding is attempted next, but since the SCH slot is not aligned with a gap elsewhere than in Gap#M, the SCH is decoded with a large latency.

(2) In the dedicated mode, the measurement time available is very short and precious. In a Long Term Evolution (LTE) active RAT case, the gaps for measurements on a GSM RAT are not regular since LTE has Discontinuous Reception (DRX) in connected mode. So, also in that situation, making sure that all the neighbor cells' SCH will fall under the time gap period is very difficult and not possible to achieve (as illustrated in FIG. 6, where C indicates the Common Control Channel (CCCH) which e.g. is PCCH or Scheduling Grant Channel (SGCH)). Since we have a two-step based approach as shown in FIG. 5 (FCCH followed by SCH), Cell selection/re-selection takes more time.

(3) In Blind Handover it takes a lot of time to search for FCCH and SCH, as shown in FIG. 1.

(4) In periodic cell reconfirmation it takes a lot of extra processing cycles to reconfirm the cell by searching for FCCH and then SCH.

Regarding cell reconfirmation, after the camp on when MS is in idle mode, the MS shall continue to monitor all BCCH carriers as indicated in the BCCH Allocation (BA) list [3GPP TS 45.008 section 6.6.1]. The MS shall first monitor the RSSI of the non-serving (neighboring) carriers (up to 32 carriers). Then, if a new carrier is found whose signal strength is greater than a defined threshold, the MS will schedule for FCCH detection on that carrier and if FCCH is found, next SCH detection will be scheduled by the MS for that carrier after getting the rough timing information about in which TDMA frame the SCH on that carrier will be appearing. If the SCH is decoded successfully, then the decoded SCH data will convey the RFN (reduced frame number which is 19 bits) and BSIC (base station identity code BCC and network identity code NCC). The MS checks for the validity of the BSIC and if the BSIC is new e.g. the cell is new and allowed then the cell is added in the cell list if it has not been added earlier e.g. if it is newly found cell. Once a new cell is found and added in the cell list, the MS tries to monitor that cell on a regular basis to re-confirm that it is monitoring the same cell. This process is known as BSIC reconfirmation. Also in the dedicated mode, the MS does the BSIC reconfirmation.

According 3GPP TS 45.008, the MS shall attempt to check the BSIC for each of the 6 strongest non serving cell BCCH carriers at least every 30 seconds in idle mode, to confirm that it is monitoring the same cells. According to TS 45.008 section 7.2, it is essential for the MS to identify which surrounding Base Station Subsystem (BSS) is being measured in order to ensure reliable handover. Thus, it is necessary for the MS to synchronize to and demodulate surrounding BCCH carriers and identify their base station identification codes (BSIC). The MS shall attempt to demodulate the SCH on the BCCH carriers of as many surrounding cells as possible, and decode the BSIC as often as possible, and as a minimum at least once every 10 seconds in connected mode.

A multi-RAT MS is allowed to extend this period to 13 seconds in connected multi-RAT scenarios, if the neighbor cell list contains cells or frequencies from other RATs. In a multi-RAT scenario, an MS shall thus, for a period of up to 5 seconds, devote all search frames to attempting to decode these BSICs. If this fails then the MS shall return to confirming existing BSICs. Having re confirmed existing BSICs, if there are still BCCH carriers among the six strongest with unknown BSICs, then the decoding of these shall again be given priority for a further period of up to 5 seconds. In Packet Idle mode or MAC-Idle state (TS 45.008, section 10.1.1.1) the MS shall attempt to check the BSIC for each of the 6 strongest non serving cell BCCH carriers at least every 14 consecutive paging blocks of that MS or 10 seconds, whichever is greater. If a change of BSIC is detected then the carrier shall be treated as a new carrier, else continue with the same carrier.

The same is applicable for Packet Transfer mode or MAC-Shared state (TS 45.008, section 10.1.1.2), where an MS shall continuously monitor all BCCH carriers as indicated by the BA (General Packet Radio Services (GPRS)) list and the BCCH carrier of the serving cell. A list containing BSIC and timing information for these strongest carriers at the accuracy required for accessing a cell (see 3GPP TS 45.010) including the absolute times derived from the parameters T1, T2, T3 shall be kept by the MS. This information may be used to schedule the decoding of BSIC and shall be used when re-selecting a new cell in order to keep the switching time at a minimum. When a BCCH carrier is found to be no longer among the reported, BSIC and timing information shall be retained for 10 seconds.

As mentioned above, the BSIC identification happens very frequently in the MS and happens in idle as well as in dedicated mode or packet transfer mode. For a single RAT GSM/GPRS MS, it is a high burden to demodulate and decode the SCH burst all the time for all the detected cells for reconfirmation purpose. Because it consumes a lot of battery power for SCH burst equalization, demodulation and decoding purposes and at the same time it consumes some time for decoding (though it is a single burst decoding).

In a Multi-RAT MS, where the MS needs to do many things in a small provided time gap (given from other RATs to GSM), the time for decoding SCH data matters a lot for the overall MS performance. The reconfirmation process discussed above is illustrated in FIG. 7; where C1, C2, ... Cn indicate the strongest GSM cells.

SUMMARY

It is an objective of the present disclosure to provide an improved method and radio device for synchronization with a network node of a GSM system, to reduce latency and energy consumption.

According to an aspect of the present disclosure, there is provided a method for synchronizing a radio device with a network node of a Global System for Mobile Communications, GSM, radio communication system. The method comprises obtaining a reference array based on a training sequence, TSC, of a synchronization burst, SB, of a synchronization channel, SCH, of the network node. The method also comprises receiving an SB including the TSC from the network node and forming a received array. The method also comprises comparing the reference array to the received array for finding a sequence of the received array that has identity with the reference array for finding the position of the TSC in the received SB. The method also comprises determining whether the identity of the found sequence with the reference array is above a predefined threshold, in which case the radio device can be time synchronized based on the found TSC.

According to another aspect of the present disclosure, there is provided a radio device configured for communication with a network node of a Global System for Mobile Communications, GSM, radio communication system. The device comprises means for obtaining a reference array based on a training sequence, TSC, of a synchronization burst, SB, of a synchronization channel, SCH, of the network node. The radio device also comprises means for receiving an SB including the TSC from the network node and forming a received array. The radio device also comprises means for comparing the reference array to the received array for finding a sequence of the received array that has identity with the reference array for finding the position of the TSC in the received SB. The radio device also comprises means for determining whether the identity of the found sequence with the reference array is above a predefined threshold, in which case the radio device can be time synchronized based on the found TSC.

The radio device of the present disclosure may be used for performing an embodiment of the method of the present disclosure.

According to another aspect of the present disclosure, there is provided a computer program product comprising computer-executable components for causing a radio device to perform an embodiment of a method of the present disclosure when the computer-executable components are run on a processor comprised in the radio device.

Problems of the prior art can be solved or at least mitigated if FCCH detection part is skipped, e.g. not received. According one aspect of the present disclosure, only the SCH channel is used for burst boundary detection, frequency error estimation and then BSIC value and RFN value finding, using a front-end SCH detection module in front of the legacy SCH reception module. Only using the SCH for synchronization will help for faster cell search, e.g. it helps in cell selection, blind handover and neighbor cell monitoring, and it also helps in saving power by skipping demodulation and decoding in cell reconfirmation.

Instead of FCCH reception and detection, the same is achieved through only SCH reception by introducing a new SCH front-end detection for efficient SCH data searching by means of a reference array based on the TSC which is the same for all network nodes (base stations) and known by the radio device. By means of the present disclosure, the performance of frequency and time synchronization can be the same with respect to 3GPP specification requirements, but the synchronization process is made much faster and with lower power consumption.

In some embodiments, if it has been determined that the identity is below the threshold, the method may further comprise performing peak correlation on the received SB for finding the position of the TSC, based on the comparing of the reference array to the received array whereby the radio device can be time synchronized based on the found TSC. By means of peak correlation, the TSC may be more definitely found e.g. if the identity has been determined to be below the threshold.

In some embodiments, the reference array is based on a previously received SB. Since the TSC is always the same for a GSM communication system, the TSC may be known from an SB received previously, which previous SB may e.g. have been detected and decoded according to the standard (legacy) method. The reference array or the known TSC may e.g. be stored in a storage unit of the radio device and retrieved there from when needed.

In some other embodiments, the reference array is preprogramed in the radio device, or precalculated by the radio device based on the known TSC. The reference array may e.g. have been programmed into the radio device upon manufacture thereof, or received via a communication network to which it has previously been connected. Alternatively, if the TSC is already known beforehand, and since it is always the same, the reference array, e.g. an angle difference sequence array or a sign array as used as examples herein, may be precalculated by the radio device based on the known TSC.

In some embodiments, the reference array is a phase angle reference array, and the comparing comprises comparing phase angles of modulated [I,Q] bit pairs of the received SB with phase angles of the reference array. This is a type of reference array which may be conveniently used in accordance with the present disclosure.

In some other embodiments, the reference array is a sign reference array, and the comparing comprises comparing the signs of ratios between I and Q of modulated [I,Q] bit pairs of the received SB with signs of the reference array. This is another type of reference array which may be conveniently used in accordance with the present disclosure. By means of this type of reference array, the comparing may be further simplified whereby time and energy may be spared.

In some embodiments, all the bits of the SB are known and the reference array is based on the whole SB. This may be the case e.g. when the SB is received as part of reconfirmation of a cell. Then the whole SB of that cell may already have been received and decoded previously why not only the TSC is previously known but also the other parts of the SB (tail bits, information bits and guard bits). The reference array may then be constructed to cover the whole SB, increasing the possibility of successfully locating the TSC (as well as the other parts of the SB) and thus the SB boundary. In some embodiments, the reference array is obtained by modulating at least some of the known SB bits to obtain an [I,Q] sample reference array. In this way, the reference array may be a reverse engineered [I,Q] sample which may be directly compared to the received [I,Q] pair bits of the received SB, for easier detection of the TSC (as well as the other parts of the SB) and thus the SB boundary. In some embodiments, as mentioned above, the synchronizing is done as part of a GSM cell reconfirmation procedure.

In some embodiments, the method further comprises, after time synchronization, estimating a frequency error of the received SB, and correcting the frequency error by [I,Q] sample rotation. Since the SB boundary has been sufficiently located by TSC detection, the frequency error can be detected and corrected without the need to first detect the FCCH. In some embodiments, the method further comprises decoding the frequency corrected SB.

In some embodiments, the synchronizing is done as part of a GSM cell selection/re-selection, blind handover, or neighbor cell monitoring procedure. These are examples of GSM procedures where the standard dictates that the FCCH must first be detected, followed by SCH detection, and where the method of the present invention, in which only the SCH needs to be detected, can be beneficially used.

In some embodiments, the radio device is a multi-RAT radio device. As discussed herein, the measurement gaps dedicated for neighboring GSM cells are particularly limited in inter-RAT scenarios where the radio device is served by another RAT than GSM. Thus, in some embodiments, the radio device is served by a RAT other than GSM during the synchronizing.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 8 is a schematic diagram illustrating an embodiment of a radio communication system in accordance with the present disclosure.

FIG. 9 is a schematic block diagram of an embodiment of a radio device of the present disclosure.

FIG. 10 is a schematic diagram of an embodiment of a computer program product of the present disclosure.

DETAILED DESCRIPTION

Figure 1:
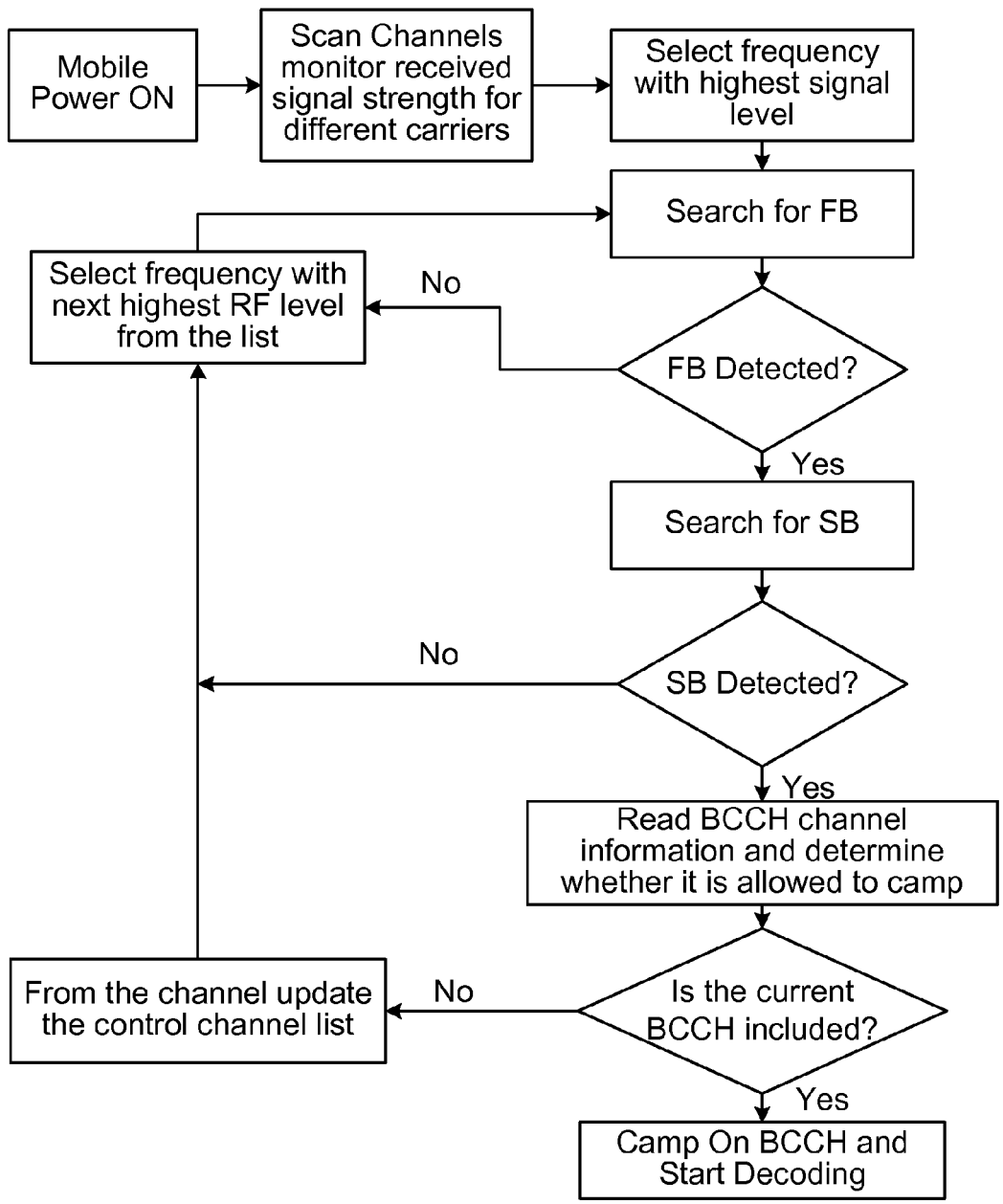
FIG. 1 is a flow chart illustrating the initial cell selection in GSM.
Figure 2:
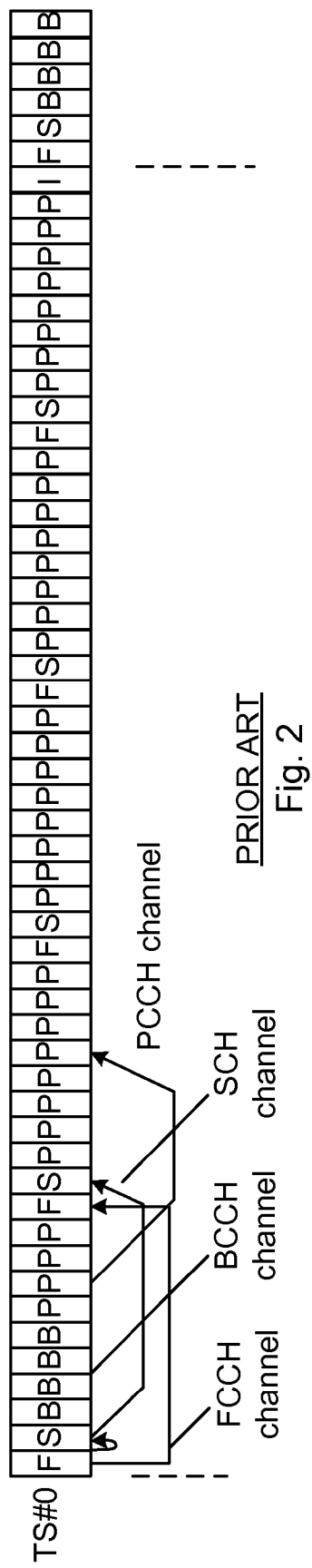
FIG. 2 is a block diagram illustrating the different channel frames of a GSM 51-multi frame structure of a time slot.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 8 schematically illustrates an embodiment of a GSM system 800. A radio device 801 is in communication or is capable of communicating with and/or able to perform measurement on a network node 803 over a radio/air interface 802. The radio device 801 may be any device, mobile or stationary, enabled to communicate over the radio cannel in the GSM communications system, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or PC. The network node 803 may e.g. be a GSM BTS. The network node is part of the Radio Access Network (RAN) implementing the Radio Access Technology (RAT) 704 (here GSM), connecting the network node (and any radio device 801 connected thereto) with a core network (CN) 805. As mentioned herein, the radio device may in some embodiments be served by another RAT than GSM, in which case it may only perform measurements in respect of the GSM network node 803 over the radio interface 802.

FIG. 9 schematically illustrates an embodiment of a radio device 801 of the present disclosure. The radio device 801 comprises a processor or central processing unit (CPU) 901. The processor 901 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 901 is configured to run one or several computer program(s) or software stored in a storage unit or memory 902. The storage unit is regarded as a computer readable means and may e.g. be in the form of a Random Access Memory (RAM), a Flash memory or other solid-state memory, or a hard disk. The processor 901 is also configured to store data in the storage unit 902, as needed. The radio device 801 also comprises a transmitter 904, a receiver 903 and an antenna 905, which may be combined to form a transceiver or be present as distinct units within the radio device 801. The transmitter 904 is configured to cooperate with the processor to transform data bits to be transmitted over a radio interface to a suitable radio signal in accordance with the RAT used by the Radio Access network (RAN) via which the data bits are to be transmitted. The receiver 903 is configured to cooperate with the processor 901 to transform a received radio signal to transmitted data bits. The antenna 905 may comprise a single antenna or a plurality of antennas, e.g. for different frequencies and/or for MIMO (Multiple Input Multiple Output) communication. The antenna 905 is used by the transmitter 904 and the receiver 903 for transmitting and receiving, respectively, radio signals.

FIG. 10 schematically illustrates a computer program product 100. The computer program product 100 comprises a computer readable medium 102 comprising a computer program 101 in the form of computer-executable components 101. The computer program/computer-executable components 101 may be configured to cause a radio device 801, e.g. as discussed above for synchronizing said radio device with a network node 803 of a GSM radio communication system, to perform an embodiment of the method of the present disclosure. The computer program/computer-executable components may be run on the processing unit 901 of the device 801 for causing the device to perform the method. The computer program product 100 may e.g. be comprised in a storage unit or memory 902 comprised in the radio device and associated with the processing unit 901. Alternatively, the computer program product 100 may be, or be part of, a separate, e.g. mobile, storage means, such as a computer readable disc, e.g. CD or DVD or hard disc/drive, or a solid-state storage medium, e.g. a RAM or Flash memory.

As described above, the FCCH detection and followed by SCH decoding process is used in many GSM procedures like cell selection/reselection, handover, neighbor cell monitoring, cell confirmation etc. Now, because of FCCH detection, a lot of time, processing cycles and power are wasted in the radio device 801 and above all, most of the time, it becomes a critical issue to complete cell monitoring process under a tight time budget in I-RAT scenarios (because time gaps provided for GSM cell selection is very limited in I RAT scenarios). So, in accordance with the present disclosure, the FCCH detection is skipped and the same output parameters/results are achieved with an added front-end SCH detector module of the radio device receiver 803 in cooperation with the processor 801. An embodiment of the proposed receiver's block diagram is shown in FIG. 11 and the algorithm is described.

Figure 3:
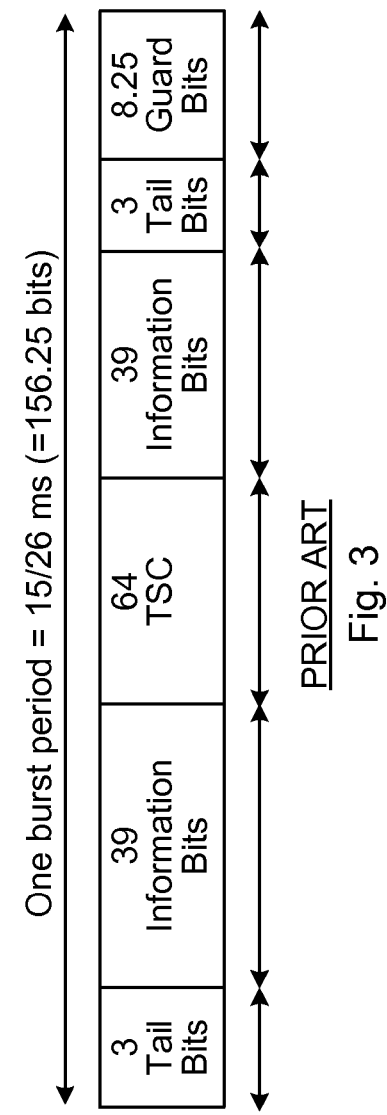
FIG. 3 is a block diagram illustrating the content of a synchronization burst of a GSM synchronization channel.
Figure 4:
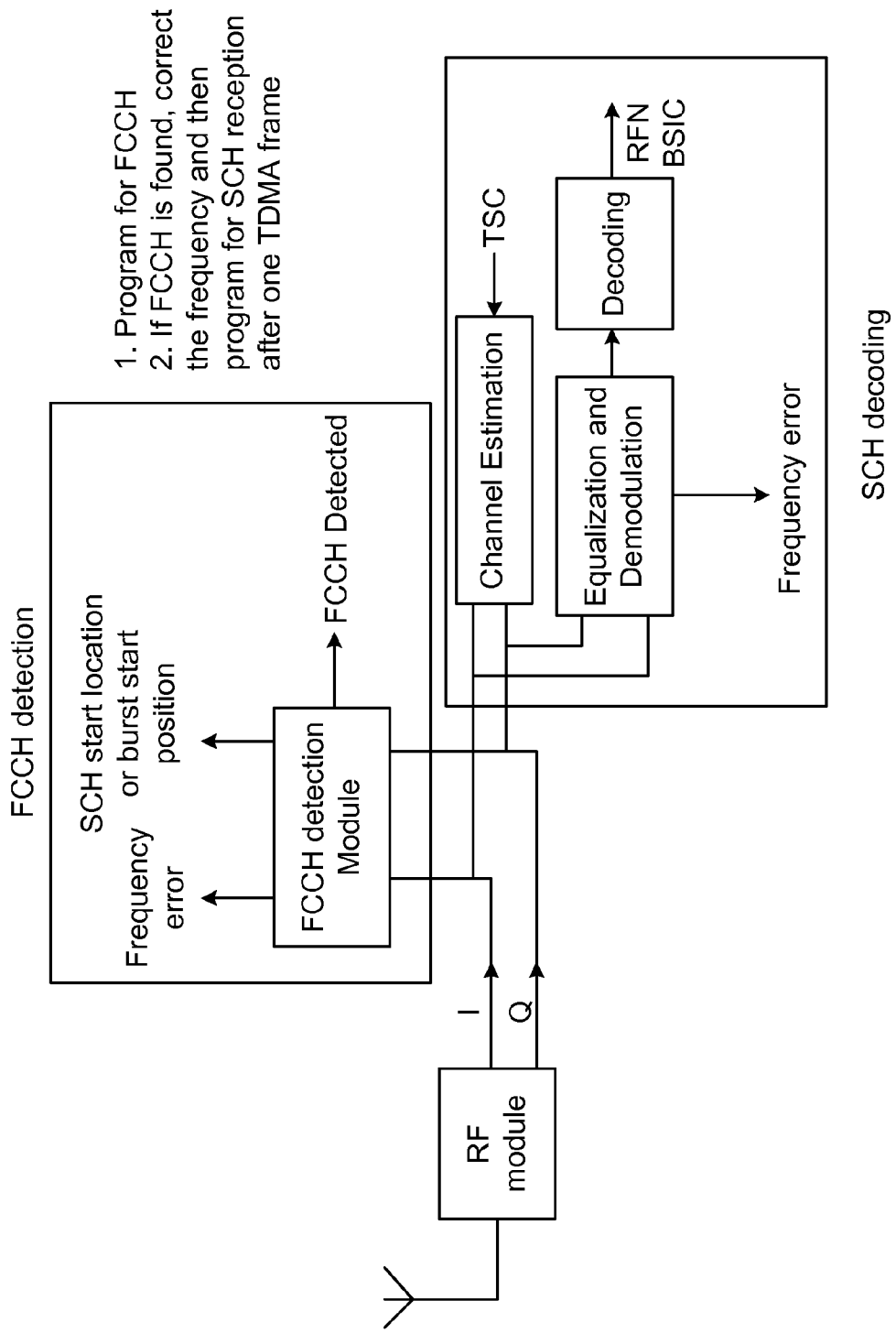
FIG. 4 is a block diagram illustrating receiver blocks of a radio receiver for synchronization in GSM.
Figure 5:
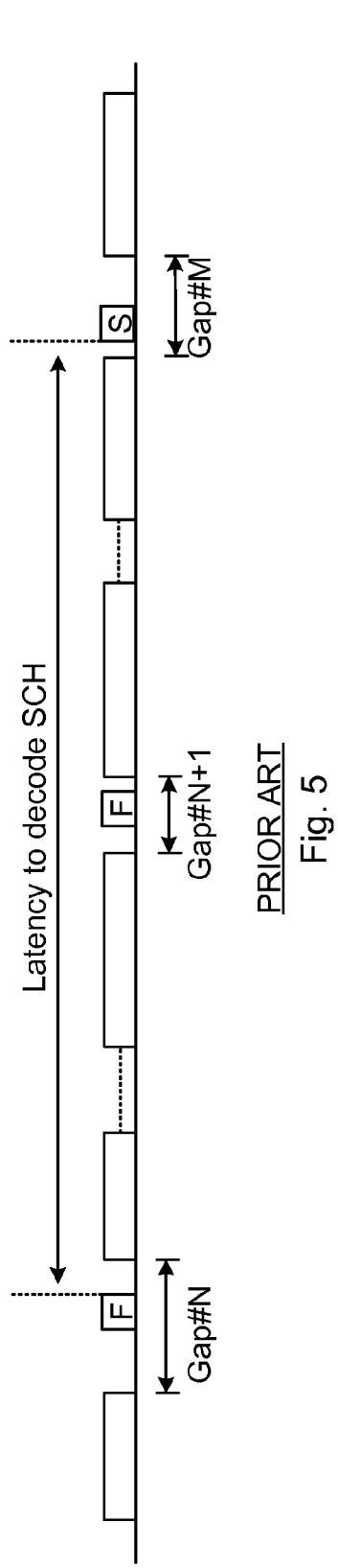
FIG. 5 is a block diagram illustrating a two-step GSM cell detection.
Figure 6:
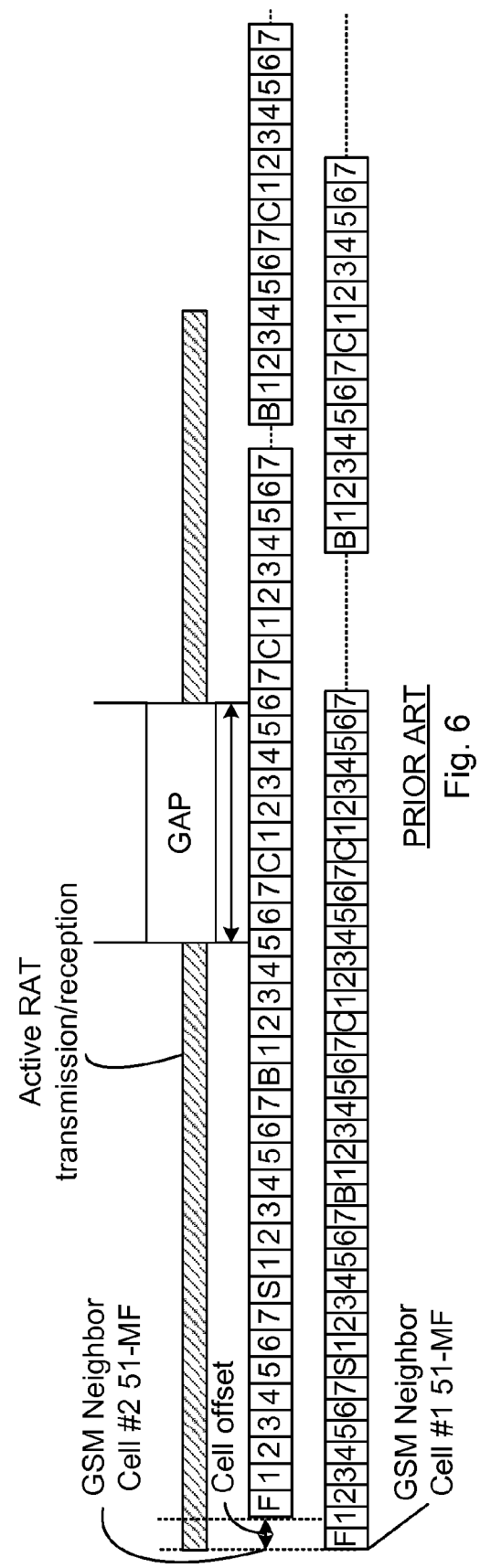
FIG. 6 is a block diagram illustrating measurement on neighboring GSM cells in a gap of a serving RAT.
Figure 11:
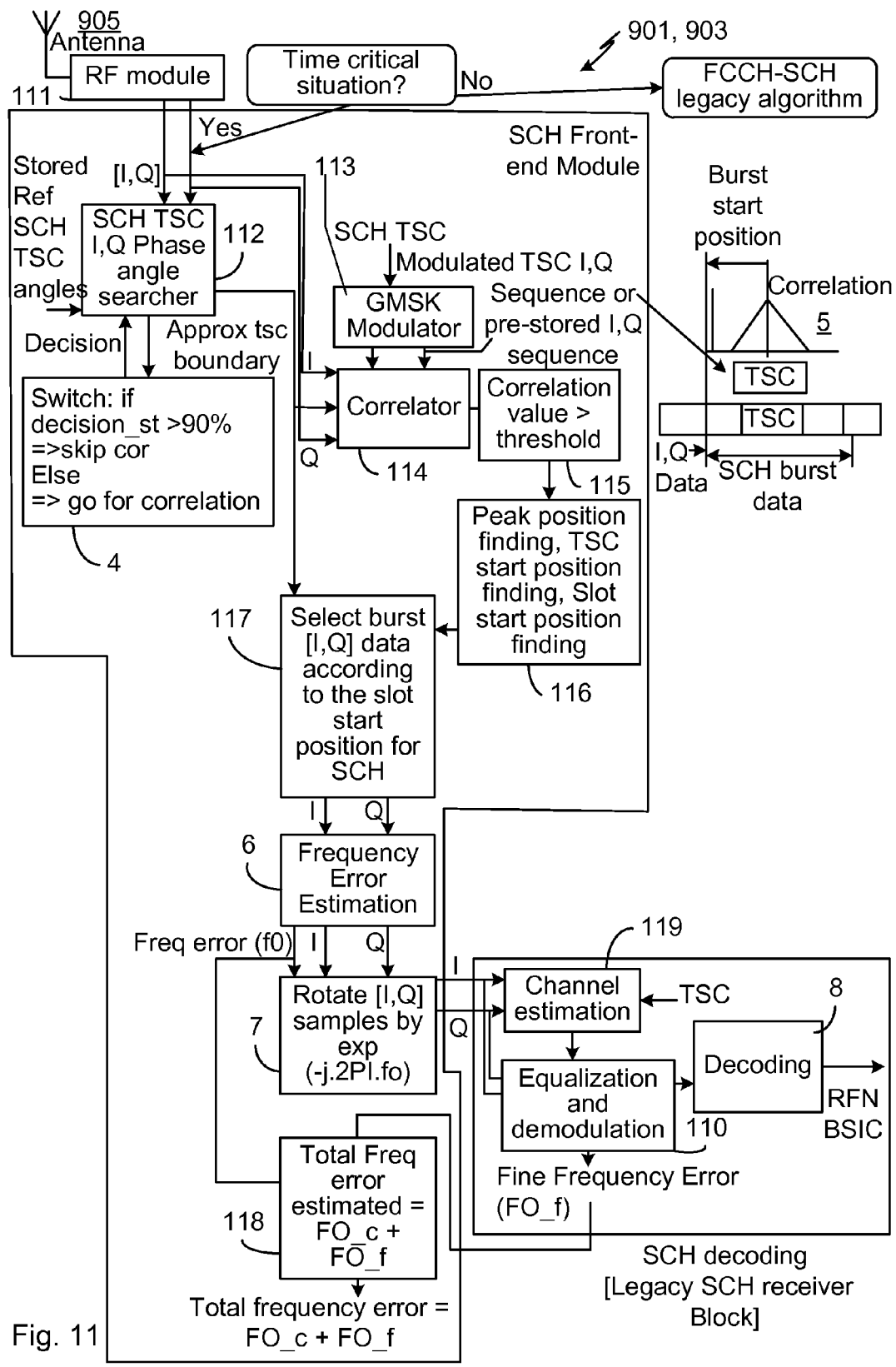
FIG. 11 is a schematic block diagram of an embodiment of an SCH front-end detector and receiver module of a radio device, in accordance with the present disclosure.

Reference is made to FIG. 11 which illustrates an example embodiment. Since, SCH contains 64 fixed TSC bits and these bits are the same for all the network nodes 803, such as BTSes or BSs, the TSC of received 2 data by the antenna 905 and RF module 111 is known by the radio device. So, instead of searching first for the FCCH burst (which has predefined 148 fixed bits) using an FCCH detector, a SCH detector module is used to search for SCH burst data to begin with, i.e., FCCH detection is skipped. SCH has 64 known bits (as shown in FIG. 3), and the front-end module will try to detect the presence of this 64-bit TSC pattern in the received 2 [I,Q] samples by means of a phase angle searcher 112 using a reference SCH TSC array, e.g., an angle difference sequence array, which is pre-stored and constant, because SCH data is always the same and it is always GMSK modulated. The SCH detection indication and the strength of decision (i.e. the determined 4 identity) is output from this block.

Then based on that determining 4, additional correlation 5 is called or skipped. If the identity is high e.g. the reference stored angle difference and SCH TSC computed angle difference are matched or have an identity of e.g. above 90% inside the burst data, then the SCH detection is successful whereby there is no need for the cycle-expensive additional correlation 5. However, if the identity is not greater than a threshold e.g. 90%, then correlation 5 is called. The correlation 5 is schematically illustrated in the figure. Peak correlation is performed to find the TSC part of the received 2 [I,Q] data, after which the start of the SB can be determined. The radio device receiver 903 can modulate the known SCH TSC by means of a GMSK modulator 113.

The modulated TSC is then used by a correlator 114. If the peak correlation of the correlator 114 is above a threshold 115, then the peak position is found and thus also the TSC start position can be found 116. The output from the correlation module will be that SCH is detected or is not detected, and if SCH is detected, then it estimates 116 the SCH burst (SB) start position by adding the bit position offset (as known from the SB structure) from the peak position found in the peak correlation 5, and the SB I,Q data is selected 117. Then, the frequency error estimated 6 and the [I,Q] data is rotated 7 by that frequency error amount to compensate from the coarse frequency error. Now, the [I,Q] data is time adjusted 117 and frequency corrected 7 by angle difference based detector and/or correlation based method. That [I,Q] will be provided to the legacy SCH decoder module. Then the receiver module will perform the actual SCH decoding operation e.g. channel estimation 119, equalization/demodulation 110 and decoding 8 operations of the frequency corrected [I,Q] samples.

The result from the SCH decoder will be the same as earlier e.g. frequency error from demodulation process and BSIC, RFN from decoding. The total frequency error 108 will be the sum of frequency error estimated from front-end SCH detector module and the SCH decoder module.

Thus using this method, the same tasks will be performed by using only SCH channel's data as when using both FCCH and SCH data. Consequently, there is no need to receive FCCH channel. Eliminating that need provides several advantages to the mobile receiver, such as the example advantages mentioned above.

The radio device, e.g. MS, may decide whether to utilize the method/algorithm of the present disclosure or to utilize the legacy method/algorithm based on whether the device is in a time and/or energy critical situation.

Figure 12:
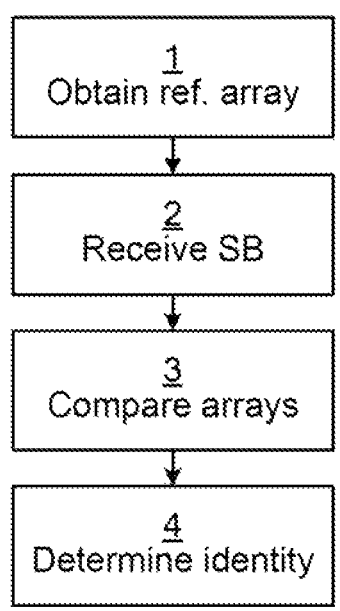
FIG. 12 is a schematic flow chart of an embodiment of a method of the present disclosure.

FIG. 12 is a flow chart of an embodiment of a method of the present disclosure. The method is performed by a radio device 801 able to perform measurement on a network node 803 as discussed herein. A reference array based on a known training sequence (TSC) of a synchronization burst (SB) of a synchronization channel (SCH) of the network node 803 is obtained 1. The reference array may e.g. be obtained from a storage 902 of the radio device where it has been stored or preprogramed, or be calculated based on previous received TSC transmission. An SB including the TSC from the network node 803 is received 2 and a received array is formed. The formed received array may conveniently be in the same format as the reference array e.g. [I,Q] bits or an angle difference sequence. Alternatively, the received array may have a different format than the reference array, e.g. received [I,Q] bits to be compared with an angle difference sequence of the reference array.

The reference array is compared 3 to the received array for finding a sequence of the received array which has identity with the reference array for finding the position of the TSC in the received SB. The identity need not be total, but may be a partial identity, such as given by an identity percentage. It is then determined 4 whether the identity of the found sequence with the reference array is above a predefined threshold, in which case the radio device can be time synchronized based on the found TSC. For instance, if the threshold is set to 90%, then if the found sequence has at least 90% identity with the reference array, it is determined 4 that the TSC has been found and the radio device can be time synchronized based on the found TSC. If the identity is below the threshold, peak correlation may be used, as discussed also in respect of FIG. 13.

Figure 13:
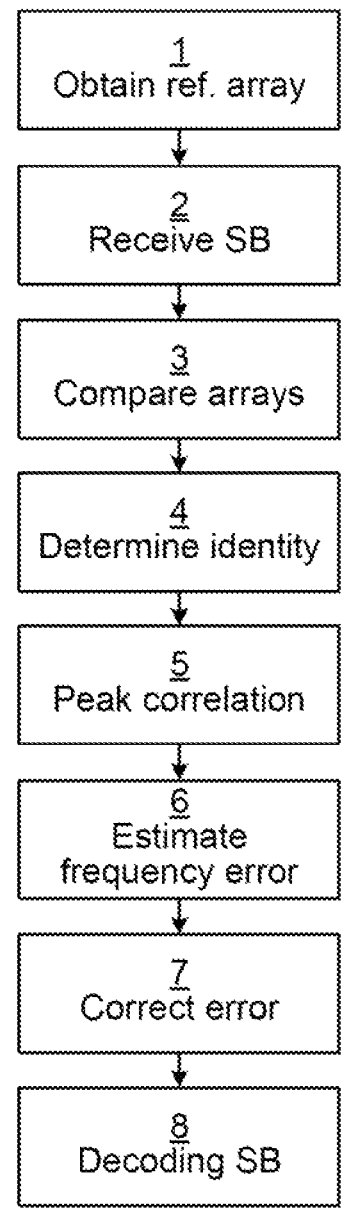
FIG. 13 is a schematic flow chart of another embodiment of a method of the present disclosure.

FIG. 13 is a flow chart of another embodiment of a method of the present disclosure. The method is performed by a radio device 801 able to perform measurement on a network node 803 as discussed herein. The obtaining 1 of a reference array, the receiving 2 of an SB, the comparing 3 of the reference array to the received array and the determining 4 of whether the identity of the found sequence with the reference array is above a predefined threshold are as discussed with reference to FIG. 12. Peak correlation may be performed 5 on the received SB for finding the position of the TSC, based on the comparing of the reference array to the received array whereby the radio device can be time synchronized based on the found TSC. If a match between the reference array and the received array is found using e.g. peak correlation or an angle search based approach, then the cell can be regarded as re-confirmed and in that case, if only re-confirmation is desired, there is no need for using power and cycles for demodulation and decoding processes.

In the peak correlation, any approximate information about the SB boundary obtained when comparing 3 the reference array with the received array can be used as a starting point for the peak correlation 5 in order to reduce the correlation cycles. After having found the TSC and thus the SB boundary, regardless of whether peak correlation has been performed 5 or not, a frequency error of the received SB may be estimated, after which the frequency error may be corrected 7 by [I,Q] sample rotation. Depending on the situation, it may also be desirable to decode 8 the frequency corrected SB.

Embodiments of the present disclosure give at least the following advantages:
(1) FCCH search prior to SCH decoding is not needed, since the SCH will be directly detected using a front-end detector module and if detected then will be decoded for getting the SCH information (BSIC, RFN). So, this makes the FCCH & SCH search operation much faster.
(2) Helps to improve the asynchronous handover performance and make it faster.
(3) Cell selection, reselection operation becomes faster.
(4) Initial cell search operation is also faster.
(5) The cell reconfirmation is made faster by employing the same comparing and/or correlation module when the whole SB is known.
(6) A significant number of processing cycles is saved.
(7) Improved power saving due to the skipping of FCCH, and direct detection and decoding of SCH burst data.
(8) Improved power saving for skipping SCH demodulation & decoding for cell reconfirmation.
(9) I-RAT measurement becomes easier due to the faster cell monitoring process.
(10) The RF module consumes a lot of power, since the RF is opened for shorter duration compared to the legacy method, so a lot of power will be saved thanks to the method and radio device of the present disclosure.

As for further examples, there may be two different general scenarios based on different GSM processes where FCCH and SCH searches are required: a first scenario—Scenario 1—where FCCH search is required first and then followed by SCH search on the same frequency, and a second scenario—Scenario 2—where only SCH fixed data (SCH info bits & TSC bits) search is needed.

Scenario 1 examples include initial cell search, blind handover, cell selection/reselection, cell confirmation and monitoring. In these cases, only SCH TSC part is known to the radio device 801 receiver 903 and the receiver can search for and detect the TSC and then demodulate and decode SCH for getting SCH information bits (RFN, BSIC).

Scenario 2 examples include cell re-confirmation. In this case, TB, SCH data part, TSC, i.e. the whole SB burst is pre-known, and the radio device 801 receiver 903 only has to confirm that the same burst data is received to re-confirm a cell.

In the context of Scenario 1, the radio device makes a choice for cell selection method, based on time criticality and power saving requirement metrics, between two approaches as below:
(A) With legacy approach implementation: where first FCCH is searched first, then once FCCH is found, the RF window opening time is adjusted to receive SCH based on that the SCH (SCH appears one TDMA frame after FCCH in time slot zero) and also time/frequency correction is done. Then SCH is received and demodulated and decoded.
  Disadvantages of the legacy approach include, as discussed above, that it takes more time to complete the synchronization process since FCCH is first searched and then SCH is searched. In a Multi-RAT scenario, that much time is not always available. Also, the power consumption is higher here due to the two-step approach. Further, the radio device cannot go to sleep state quickly after FCCH since it has to wait for SCH.
(B) SCH only detection and decoding approach in accordance with the present disclosure, whereby only the SCH is detected and, if detected, then decoded as shown in FIG. 11 and further explained below.

The RF module 111 is programmed for receiving the wanted broadcast frequency (cell frequency) and then the [I,Q] samples are fed to the SCH front-end module. Here, the SCH time slot location or where it is present is not known a priori, because FCCH detection has not been performed. So, the SCH data has to be searched in the received non-burst time aligned [I,Q] buffer.

The Training sequence TSC of SCH burst is 64 bit long and the same TSC is used by all GSM cells for SB. So, the radio device 801 tries to check whether and where the SCH TSC pattern lies in the received [I,Q] buffer. This can be done by many methods and one such method is a correlation-based method. But as the SCH TSC length is long (64 bits) and we need to search the data over the entire burst data. A correlation method will consume more Million Instructions Per Second (MIPS). Also, finding the actual peak position through only peak correlation may be difficult since the peak might not always be distinct. Thus, a module SCH TSC [I,Q] Phase angle searcher 112 may be used, which uses fewer cycles and helps in the search for the SCH TSC.

SCH TSC I,Q Phase angle searcher 112: This block helps to detect whether the received [I,Q] buffer contains the SCH TSC data or not by comparing the phase angle between the received 2 [I,Q] sample pairs and the obtained 1 SCH TCH [I,Q] phase angle reference array.

For example, the received [I,Q] pair=>X[n]=(I[n],Q[n]). Where n is the data burst length (say, ~156 bits in GSM). Then we need to compute the phase angle for this burst data A[n]

$$A[n]=\tan^{-1}(Q(n)/I(n)) \quad (1)$$

So, the angle for the received 156 [I,Q] pairs are computed and this is A[n]. Then the difference angle is computed as D[n]

$$D[n]=A[n+1]-A[n] \quad (2)$$

Now, this is compared with the stored reference SCH TSC angles SCH_TSC_ANG_DIFF[n].

For the SCH burst, as mentioned earlier, the data bit pattern for the 64 bits TSC are always the same, and that is: (1,0,1, 1,1,0,0,1,0,1,1,0,0,0,1,0,0,0,0,0,0,1,0,0,0,0,0,0,1,1,1,1,0,0,1, 0,1,1,0,1,0,1,0,0,0,1,0,1,0,1,1, 1,0,1,1,0,0,0,0,1,1,0,1,1)

Now, if this constant data pattern is GSM modulated then the I,Q pair from each corresponding modulated bit will follow a signal pattern where the jump of angle from one point to the next will be defined by the previous 4 bits. That means here if "1,0,1,1" first sequence is pushed into the GMSK modulator then if the next bit 1 is pushed in, then the angle jump from the present angle will be a constant angle jump.

As specified in 3GPP GERAN TS 45.004, in GSM, the differentially encoded non-return to zero (NRZ) signal is passed through a linear filter with impulse response defined by:

$$g(t) = h(t) * rect\left(\frac{1}{T}\right) \quad (3)$$

where the function rect(x) is defined by:

$$rect\left(\frac{t}{T}\right) = \frac{1}{T} \text{ for } |t| < \frac{T}{2} \quad (4)$$

$$rect\left(\frac{t}{T}\right) = 0 \text{ otherwise} \quad (5)$$

and * means convolution. h(t) is defined by:

$$h(t) = \frac{\exp\left(\frac{-t^2}{2\delta^2 T^2}\right)}{\sqrt{(2\pi)} \cdot \delta T} \quad (6)$$

where

-continued $$\delta = \frac{\sqrt{\ln(2)}}{2\pi BT} \quad (7)$$

and $$BT = 0.3$$

where B is the 3 dB bandwidth of the filter with impulse response h(t). This theoretical filter is associated with tolerances defined in 3GPP TS 45.005.

The phase of the modulated signal is:

$$\varphi(t') = \sum_i \alpha_i \pi h \int_{-\infty}^{t'-iT} g(u)\,du \quad (8)$$

where the modulating index h is ½ (maximum phase change in radians is π/2 per data interval). The time reference t'=0 is the start of the active part of the burst. This is also the start of the bit period of bit number 0 (the first tail bit) as defined in 3GPP TS 45.002. The modulated RF carrier, except for start and stop of the TDMA burst may therefore be expressed as:

$$x(t') = \sqrt{\frac{2E_c}{T}} \cdot \cos(2\pi f_0 t' + \varphi(t') + \varphi_0) \quad (9)$$

where Ec is the energy per modulating bit, f0 is the center frequency and φ0 is a random phase and is constant during one burst.

Now, from the GMSK property, in theory, each bit influences the phase at any time in the past and in the future. However, this affect is small a few bits away in the past. A few bits later the phase gets increased or decreased by a nearly constant angle. It means, in a long period the bits have a cumulative (summed) effect on the phase, and the influence of each bit is steady outside a short transient time interval. Theoretically, it is noticed that the change of angle based on the next input data bit as '1' or '0' is constant.

In the receiver side, RF module 111 down convert the RF signal (f0 frequency) to base-band and passes the I,Q data to block 112. From equation (1), Computed angle A[n]

$$A[n]=\phi(tn')+\phi_0=\tan^{-1}(Q(n)/I(n))=\tan^{-1}(\cos(\phi(t')+\phi_0)/\sin(\phi(t')+\phi_0)) \quad (10)$$

Then difference angle D[n]

$$D[n]=(\phi(tn+1')+\phi_0)-(\phi(tn')+\phi_0)=A[n+1]-A[n] \quad (11)$$

So, as the SCH TSC is a constant bit pattern, so, the constant D[n] pattern will also be observed in the actual received SCH burst data. The reference angle difference data for SCH TSC bit pattern is pre-stored in the memory 902 SCH_TSC_ANG_DIFF[n]. This can also be stored when one prior SCH is decoded.

Then, SCH_TSC_ANG_DIFF[n] of 60 angle values (first 4 angles are not taken as GMSK takes 4 bits to shape or angle jump remembers the past 4 bits as described earlier) is searched in the received and computed angle difference array of D[n]. Only sign value match searching will be enough.

If the matching pattern is found then the decision strength (identity) is determined 4 as below:

If more than 50 angle signs (e.g. >80% identity) of SCH_TSC_ANG_DIFF[n] matches in the located sequence of D[n], then the next level search based on peak correlation 5 is skipped. This search provides the SCH TSC start location and SB starting boundary.

Else, the correlation-based method is employed. But since correlation takes lots of cycles if the start position is not known, then, here, from the SCH TSC I,Q Phase angle searcher module 112 the approximate start boundary of the SCH TSC pattern is detected (even if the identity was not high enough for conclusiveness) and then the correlation is started around that position.

Figure 14:
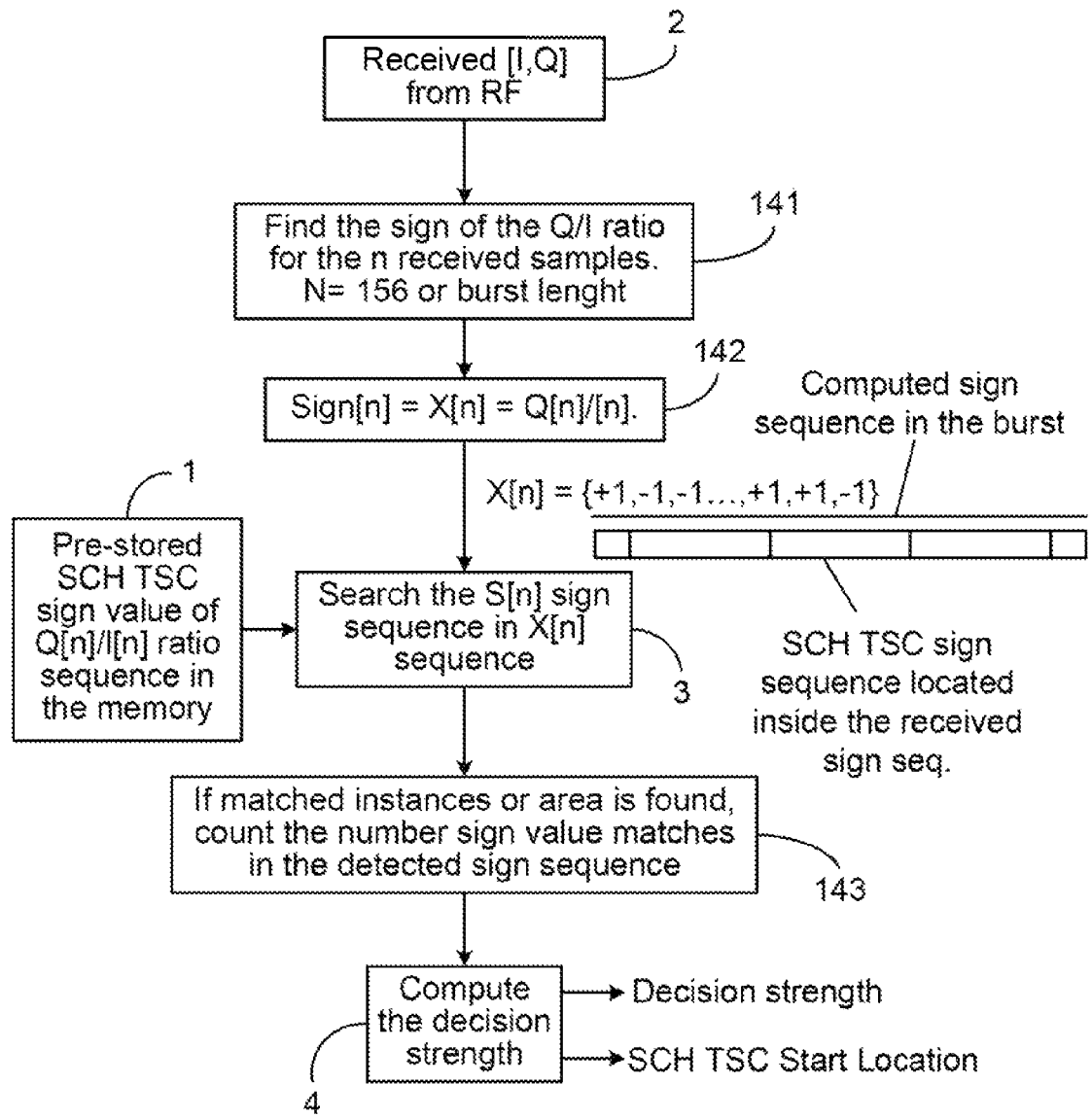
FIG. 14 is a schematic flow chart of an embodiment of an SCH TSC sequence search using a reference array, in accordance with the present disclosure.

Alternatively, instead of the phase angle reference array, a sign reference array may be used. Reference is made to FIG. 14.

The above SCH TSC I,Q Phase angle searcher 112 operation can be simplified by using the following approach:

When the radio device 801 receives 2 the SCH burst, the ratio of (Q/I) for each pair of received I,Q sample for the 64 bits TSC sequence is captured and stored. This can be tuned on the radio device platform once or during the operation when radio device decodes the SCH for the first time—it can store these sign values of the (Q/I) ratio. Here, the value of ratio may not be so important; rather we use the sign value of the ratio. The sign part of the ratio is considered here. So, the sign of each I/Q pair of the SCH TSC sequence is pre-stored in the memory 902.

Thus, for each I,Q sample pair, calculate: S[n]=sign of (Q[n]/I[n]). X[n] could be +1 or −1 value and only the sign value is kept. The S[n] sequence is an array of length 64 for 64 bits the angles which are pre-stored. But the first 4 angles are not considered since GMSK has at least 4 bits ISI (past 4 bits influence the present bit). So, a total of 60 sign sequence values are stored in the S[n] reference array.

The captured value of this S[n] sequence from the simulation is found as below:

S[n]=[+1, −1, +1, +1, −1, −1, −1, −1, +1, −1, −1, −1, −1, +1, +1, −1, −1, +1, −1, +1, −1, −1, +1, 1, −+1, +1, −1, +1, +1, +1, −1, +1, +1, +1, +1, −1, +1, +1, +1, −1, +1, −1, +1, +1, −1, −1, +1, −1, +1, −1, −1, +1, +1, −1, −1, −1, −1, +1, −1, −1, −1, −1, +1, +1] => this sequence is of length 64, but first 4 can be omitted as explained earlier.

Then during the operation:

When any SB is received 2, this module first computes 141 the sign value of the ratio of each I,Q pair from each I,Q pair.

X[n]=sign of (Q[n]/I[n]). X[n] sequence 142 has a length of 156 e.g. burst length.

Then the S[n] sequence is compared 3 over the X[n]. Here only sign (+ve or ve) pattern is searched for matching.

When the pattern is found 143, then the matching sign instances are computed and then from that, the strength (% identity) of decision is determined 4 and related to a threshold. If all the sign sequences of S[n] matches in the X[n] starting from some location, then 100% identity is determined 4. Else, proportional decision is taken according to the percentage of identity.

Using a sign array may be a simpler process than using the phase angle array. Regardless of the type of reference array used, if the identity is not above the threshold, then peak correlation 5 may be used.

The template data (from the GMSK modulator 113) is correlated by the correlator 114 in a loop with the received 2 data and the correlation value is compared with a pre-defined threshold value.

If the correlation value is greater than threshold value (step 115), then it indicates that a possible SCH burst data sequence is found in the received [I,Q] data.

If (correlation peak>threshold) then peak position of the correlation is detected 116, say $P_{tsc\_sch}$. Then the SCH burst start position from this obtained peak position will be at a distance (64/2+39+3) bits earlier e.g. 74 bits earlier (left side). So, adjust the burst start position accordingly and then select 117 the burst data (e.g. 156.25 number of I,Q data from burst start position) accordingly. Sometime some extra buffer of extra five I,Q data (on both side of burst) are also taken into the bursts data, that is to be on safer side to give some allowance to the SCH start position estimation error.

For TSC boundary finding 116: the actual TSC boundary is found based on the peak position decision from the correlation method and SCH TSC I,Q Phase angle searcher module 112 estimated TSC start position.

The switch module 4 helps to decide whether to skip the correlation method or not. If the decision obtained from the SCH TSC I,Q Phase angle searcher module 112 is good enough then correlation is skipped.

Once the SCH TSC is found, then the SCH burst starting position (boundary) is estimated 116 from the TSC position. That much of the I,Q data is taken as the SCH burst received data. The SB boundary is found from the SCH TSC I,Q Phase angle searcher method and from the peak correlation.

After the SB boundary has been found, the frequency error can be estimated 6 and corrected 7.

The frequency error is estimated 6 from the selected I,Q SCH burst data. Then the frequency error is corrected 7 by I,Q sample rotation method. The coarse frequency error is estimated 6, which provides the coarse frequency error (FO_c). Then the received 2 I,Q samples are rotated 7 by that estimated Freq offset amount e.g. by exp(−j2.pi.FO_c) and fed to the legacy existing SCH demodulator and decoder module.

The time and frequency corrected SCH burst (SB) data is fed to the legacy SCH decoder module. This module has a channel estimator 119 and a demodulator/equalizer block 110. This can tolerate a time error up to +8 or −8 bits; the more the time error, the more expensive to find TSC optimum search and channel estimation. So, here to re-use the legacy SCH demodulator & decoder module, the time and frequency error are corrected by SCH front-end module.

The Legacy SCH demodulator 110 module will demodulate the SCH burst and provide the fine frequency error.

The overall frequency error 118 will then be the sum of coarse frequency error estimated 6 and fine frequency error estimated by the demodulator 110.

Here, the I,Q samples of the SB will behave as if the frequency correction is done and the burst time alignment is also done before calling the legacy SCH module. That means now there is no difference, between the legacy method where FCCH is called first then frequency is corrected and then burst boundary is also known, and the present method where FCCH detection is skipped and the SCH front-end module has detected the SCH burst data and the frequency corrected and time aligned the bursts data for demodulation and decoding of the SCH burst.

That legacy decoding 8 module does the same process as SCH bit detection operation e.g. channel estimation, demodulation and decoding operations of the received and coarse frequency error corrected [I,Q] samples. Then this module will provide the below like the existing SCH decoding procedure:
(a) Truly, SCH is detected or not (if CRC passes)
(b) BSIC (BCC, NCC)
(c) Reduced Frame Number
(d) Slot start position offset
(e) Fine Frequency error (FO_f)

But according to the present method, the total frequency error 118 for the system will be coarse frequency error (FO_c) plus fine frequency error (FO_f). That needs to be corrected and given to the automatic frequency control (AFC) algorithm for clock or phase locked loop (PLL) correction.

So, by using this method, all the information will be found as would be found using FCCH followed by SCH reception operation, but with the advantage of not having to detect the FCCH. This method will help to skip the FCCH reception and help to camp, handover and cell confirmation operations much faster.

In the context of Scenario 2, as mentioned earlier, once the BSIC of a cell is identified and added in the cell list, then next time when the radio device 801 wants to reconfirm the BSIC, that time the radio device knows in which TDMA frame the SCH of that BCCH carrier will appear and schedules the SCH reception accordingly. There could be a small time adjustment or timing offset between this cell's SCH slot and the SCH reception slot or it could be because of multi-path channel effect, in which case the SCH might not be exactly burst aligned with the reception 2.

Figure 15:
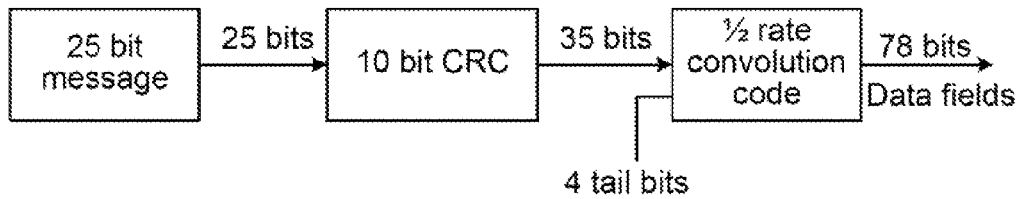
FIG. 15 is a schematic flow chart of an embodiment of a reconstruction of a synchronization burst in a radio device, in accordance with the present disclosure.

Apart from the scheduling frame information for SCH reception, in this scenario, the radio device 801 also knows the BSIC and RFN number of the SCH burst which it is going to receive 2. So, all the bit content of the SB now is known to the radio device. The SB structure is shown in FIG. 3. As shown in FIG. 15, during SCH reconfirmation or cell reconfirmation process, the 19 bit RFN (reduced frame number) and six-bit BSIC number is known. So, total 19+6=25 bits SCH data are known. Then ten bits cyclic redundancy check (CRC) is generated according to the 3GPP specification and four tail bits are added to make 39 bits SCH data as shown in FIG. 15. Then this data is ½ rate convolution encoded whereby 78 bits data pattern is generated. Putting together TB(3), Data (39), TSC (64), Data (39) and TB(3) the SCH burst is formed. Then this is GMSK modulated and used as the reference array in the SCH search algorithm using the correlation process. If the correlation data matches e.g. greater than threshold value, then the SCH demodulation and decoding can be skipped.

From FIG. 15 it is evident that since the BSIC and RFN is known to the radio device, all the information bits including the data part, TSC part, Tail bit parts and guard bit parts i.e. the whole 156.25 bits are known a priori to the radio device 801 during the reception 2.

Generally, this received burst data is equalized, demodulated and decoded in normal legacy method. This takes around 200 000 digital signal processor (DSP) processor cycles (with single antenna interference cancellation (SAIC) equalizer and Viterbi decoder) and takes around 200 000/312 μs=641 μs time to complete the process (assuming that the DSP runs at 312 MHz]. This is an extra overhead to the radio device. since this reconfirmation process is happening at a minimum rate of every 10 s for every cell. Simply put, this overhead is a big burden for the radio device with respect to time and processing power. This rate will increase if the cell numbers are more.

Figure 16:
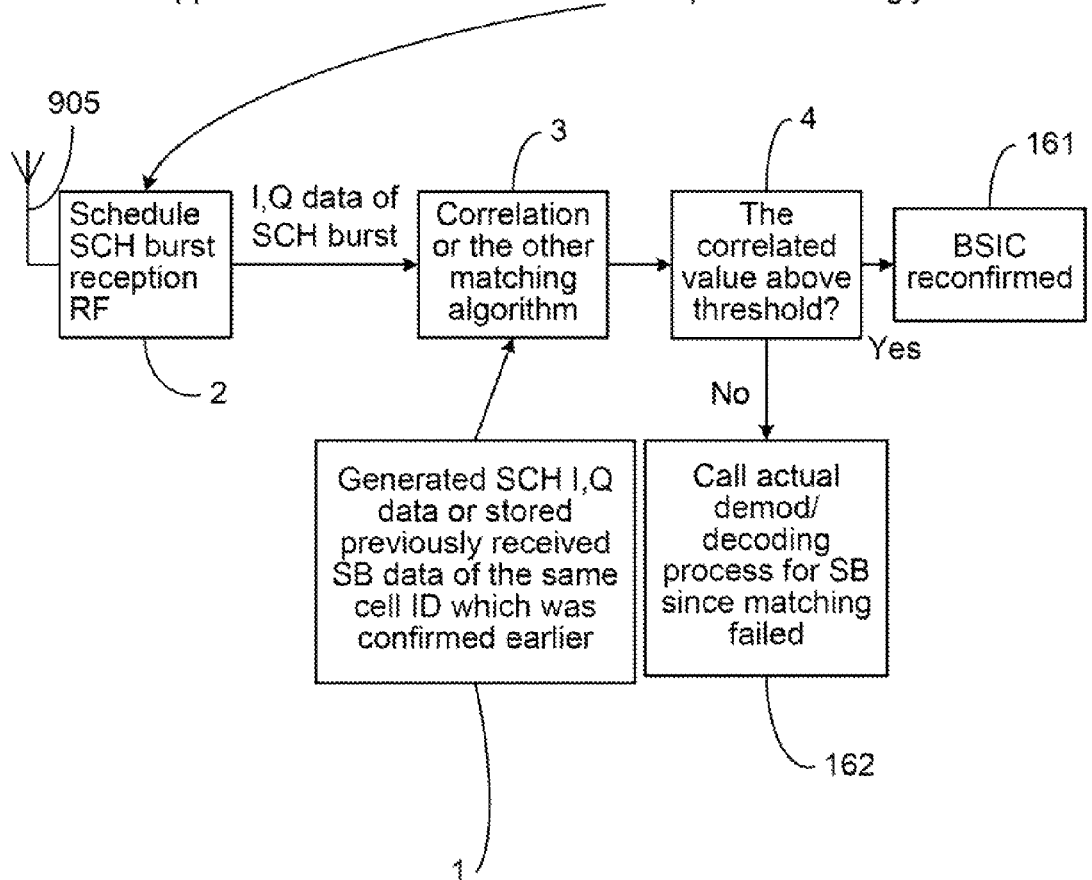
FIG. 16 is a schematic flow chart of an embodiment of a method for cell reconfirmation, in accordance with the present invention.

Now, according to the present method and with reference to FIG. 16, instead of decoding the SCH burst data, the radio device can just detect the SCH burst by using simple detection logic since the entire burst data is known a priori. The proposed method comprises:
(1) Radio device 801 knows the BSIC number since it knows the cell ID beforehand as it is going to monitor and reconfirm the same. So, BSIC ID is known.
(2) Radio device 801 knows the RFN number since the appearance of the SCH in the 51-multi frame structure is known a priori and radio device 801 maintains a list for that.

Figure 7:
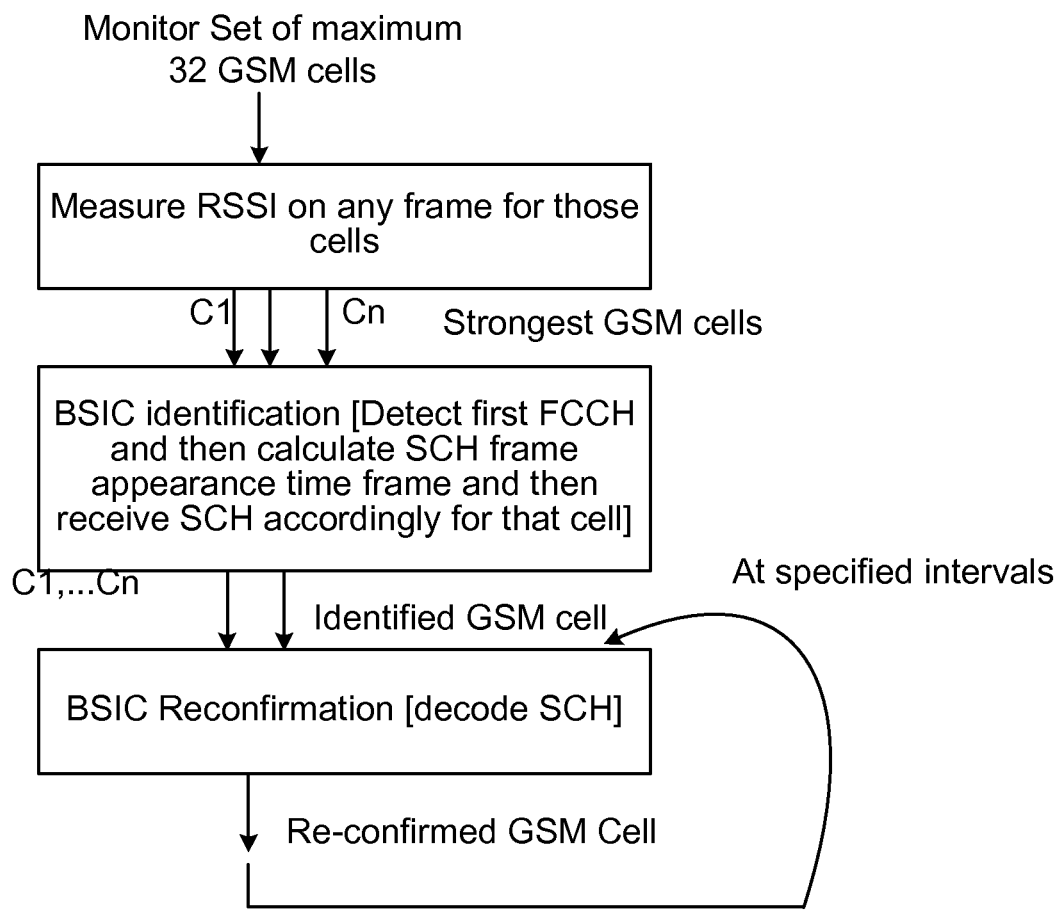
FIG. 7 is a block diagram illustrating GSM cell reconfirmation.

(3) Use this BSIC (6 bits) and RFN (19 bits) as input and encode the data for SCH transmission.
(4) Then the radio device forms the SB burst by putting together the TSC, TB and GB part as shown in FIG. 15.
(5) GMSK Modulate the burst pattern and generate I,Q data of SCH burst.
(6) This data will be then used as reference template data for matching with the incoming received 2 I,Q data from the RF module 111.
(7) If the received 2 I,Q data and this pre-stored I,Q data matches, then it will be considered as BSIC is reconfirmed 161. Else if it fails then for better decision purpose, actual SCH decoding will be triggered 162 to confirm, which is like the existing legacy procedure. In that case it will make sure that it could be having different BSIC number or failure could be due to some other reason.
(8) For the matching purpose, a correlator 114 which is already there in the SCH front-end detector will be used. Only correlator or SCH TSC sign detector 112, 141 along with corrector 7 can be used to the matching and detecting the SCH burst.
(9) The stored pattern (the reference array) can be generated as explained above or it can be pre-stored when at the first time decoding happened for BSIC identification as shown in FIG. 7. That means when SCH for a cell is decoded (first time for BSIC identification) and added into the cell list, during that time the received I,Q data for that cell can be also stored. That will be used as reference I,Q data in the correlation process. This will make the process much simpler.

The same SCH front-end module will also be used for quick cell re-confirmation. But, here instead of using only 64 bit TSC, here the whole SB burst pattern is known and generated for comparison and matching 3 with the received 2 SB. That means during the cell re-confirmation, if the received 2 [I,Q] data matches 3 with the generated 1 SCH template data then it will indicate the reconfirmation success 161. Else, if failed then the legacy SCH demodulation and decoding process will be called 162 for 2nd level of confirmation of failure.

This process will help for quick cell re-confirmation and save power by avoiding demodulation and decoding.

Thus, according to one aspect of the present disclosure, there is provided a radio device 801 configured for communication with a network node 803 of a Global System for Mobile Communications, GSM, radio communication system 800. The radio device comprises processor circuitry 901 for obtaining 1 a reference array based on a training sequence, TSC, of a synchronization burst, SB, of a synchronization channel, SCH, of the network node. The radio device also comprises receiver circuitry 903 for receiving 2 an SB including the TSC from the network node and forming a received array. The radio device also comprises processor circuitry 901 for comparing 3 the reference array to the received array for finding a sequence of the received array which has identity with the reference array for finding the position of the TSC in the received SB. The radio device also comprises processor circuitry 901 for determining 4 whether the identity of the found sequence with the reference array is above a predefined threshold, in which case the radio device can be time synchronized based on the found TSC.

According to another aspect of the present disclosure, there is provided a radio device 801 configured for communication with a network node 803 of a Global System for Mobile Communications, GSM, radio communication system 800. The radio device comprises a processor 901, and a storage unit 902 storing instructions 1001 that, when executed by the processor, cause the radio device to obtain 1 a reference array based on a training sequence, TSC, of a synchronization burst, SB, of a synchronization channel, SCH, of the network node. The instructions also cause the radio device to receive 2 an SB including the TSC from the network node 803 and form a received array. The instructions also cause the radio device to compare 3 the reference array to the received array for finding a sequence of the received array which has identity with the reference array for finding the position of the TSC in the received SB. The instructions also cause the radio device to determine 4 whether the identity of the found sequence with the reference array is above a predefined threshold, in which case the radio device can be time synchronized based on the found TSC.

According to another aspect of the present disclosure, there is provided a computer program 1001 of a radio for communication with a network node 803 of a Global System for Mobile Communications, GSM, radio communication system 800. The computer program comprises computer program code 1001 which is able to, when run on a processor 901 of the radio device, cause the radio device to obtain 1 a reference array based on a training sequence, TSC, of a synchronization burst, SB, of a synchronization channel, SCH, of the network node. The code is also able to cause the radio device to receive 2 an SB including the TSC from the network node 803 and form a received array. The code is also able to cause the radio device to compare 3 the reference array to the received array for finding a sequence of the received array which has identity with the reference array for finding the position of the TSC in the received SB. The code is also able to cause the radio device to determine 4 whether the identity of the found sequence with the reference array is above a predefined threshold, in which case the radio device can be time synchronized based on the found TSC.

According to another aspect of the present disclosure, there is provided a computer program product 1000 comprising an embodiment of a computer program 1001 of the present disclosure and a computer readable means 1002 on which the computer program is stored.

The present disclosure has mainly been described above with reference to a few embodiments. However, as is readily appreciated by a person skilled in the art, other embodiments than the ones disclosed above are equally possible within the scope of the disclosure, as defined by the appended patent claims.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for synchronizing a radio device with a network node of a Global System for Mobile Communications, GSM, radio communication system, the method comprising:
    obtaining a reference array based on a training sequence, TSC, of a synchronization burst, SB, of a synchronization channel, SCH, of the network node;
    receiving an SB including the TSC from the network node and forming a received array;
    comparing the reference array to the received array for finding a sequence of the received array which has identity with the reference array, for finding a position of the TSC in the received SB;

determining whether the identity of the found sequence with the reference array is above a predefined threshold; and synchronizing the radio device based on the found TSC, if it has been determined that the identity is above the predefined threshold.

2. The method of claim 1, further comprising, if it has been determined that the identity is below the predefined threshold, performing peak correlation on the received SB for finding the position of the TSC, for synchronizing the radio device based on the found TSC.

3. The method of claim 1, wherein the reference array is based on a previously received SB.

4. The method of claim 1, wherein the reference array is preprogramed in the radio device, or precalculated by the radio device based on the TSC, which is known by the radio device.

5. The method of claim 1, wherein the reference array is a phase angle reference array, and wherein the comparing comprises comparing phase angles of modulated [I,Q] bit pairs of the received array with phase angles of the reference array.

6. The method of claim 1, wherein the reference array is a sign reference array, and the comparing comprises comparing the signs of ratios between I and Q of modulated [I,Q] bit pairs of the received array with signs of the reference array.

7. The method of claim 1, wherein all the bits of the SB are known and the reference array is based on the whole SB.

8. The method of claim 7, wherein the reference array is obtained by modulating at least some of the known SB bits to obtain an I,Q sample reference array.

9. The method of claim 7, wherein the synchronizing is done as part of a GSM cell reconfirmation procedure.

10. The method of claim 1, further comprising, after synchronizing:

estimating a frequency error of the received SB; and
correcting the frequency error by [I,Q] sample rotation.

11. The method of claim 10, further comprising decoding the frequency corrected SB.

12. The method of claim 1, wherein the synchronizing is done as part of a GSM cell selection/re-selection, blind handover, or neighbor cell monitoring procedure.

13. The method of claim 1, wherein the radio device is a multi-radio access technology, RAT, radio device.

14. The method of claim 13, wherein the radio device is served by a RAT other than GSM during the synchronizing.

15. A radio device configured for communication with a network node of a Global System for Mobile Communications, GSM, radio communication system, the device comprising:

receiver circuitry configured to receive a synchronization burst, SB, on a synchronization channel of a network node, said received SB including a training sequence, TSC; and processor circuitry operatively associated with the receiver circuitry and configured to:

obtain a reference array based on the TSC;

compare the reference array to a received array formed from the received SB, for finding a sequence of the received array which has identity with the reference array and thereby finding a position of the TSC in the received SB;

determine whether the identity of the found sequence with the reference array is above a predefined threshold; and synchronize the radio device based on the found TSC, if it is determined that the identity is above the predefined threshold.

16. A non-transitory computer-readable medium storing a computer program comprising program instructions that, when executed by processor circuitry of a radio device, configure the radio device to:

form a received array from a received synchronization burst, SB, that is received on a synchronization channel of a network node and that includes a training sequence, TSC;

obtain a reference array based on the TSC;

compare the reference array to a received array formed from the received SB, for finding a sequence of the received array which has identity with the reference array and thereby finding a position of the TSC in the received SB;

determine whether the identity of the found sequence with the reference array is above a predefined threshold; and synchronize the radio device based on the found TSC, if it is determined that the identity is above the predefined threshold.

17. A method of time synchronizing a radio device with a network node comprising:

receiving a synchronization burst, SB, on a synchronization channel of the network node, wherein the received SB includes a training sequence, TSC;

forming a received array from the received SB;

comparing the received array with a reference array that is based on the TSC, to find a sequence in the received array that matches with the reference array; and considering the TSC to be found in the received SB when the sequence found in the received array matches with the reference array at or above a predefined matching threshold, referred to as an identity threshold, and correspondingly synchronizing the radio device based on the found TSC.

* * * * *